United States Patent [19]

Hoffmann

[11] 4,196,774

[45] Apr. 8, 1980

[54] RADIATOR MOUNTINGS FOR MOTOR VEHICLES

[75] Inventor: Willi Hoffmann, Russelsheim, Fed. Rep. of Germany

[73] Assignee: General Motors Corporation, Detroit, Mich.

[21] Appl. No.: 878,068

[22] Filed: Feb. 15, 1978

[30] Foreign Application Priority Data

Feb. 16, 1977 [DE] Fed. Rep. of Germany ....... 2706473

[51] Int. Cl.² ............................................. F28F 9/00
[52] U.S. Cl. ........................................ 165/67; 165/69; 165/149; 180/68 R; 248/232; 248/632; 248/635
[58] Field of Search ................. 180/68 R; 165/67, 69, 165/82, 149; 248/632, 635, 232, 233, 234

[56] References Cited

U.S. PATENT DOCUMENTS

| 1,477,845 | 12/1923 | O'Brien | 165/149 |
|---|---|---|---|
| 2,755,874 | 7/1956 | Adloff | 180/68 R |
| 3,318,409 | 5/1967 | Kiehnle | 180/68 R |
| 3,340,948 | 9/1967 | Deckert et al. | 180/68 R |
| 3,700,061 | 10/1972 | Hortnagl | 180/68 R |
| 3,929,201 | 12/1975 | Hoffman | 180/68 R |
| 4,121,682 | 10/1978 | Schaal et al. | 180/68 R |

FOREIGN PATENT DOCUMENTS 914325  1/1963  United Kingdom ..................... 165/67

*Primary Examiner*—Sheldon Richter
*Attorney, Agent, or Firm*—R. L. Phillips

[57] ABSTRACT

A radiator mounting assembly for a motor vehicle comprises pins on the base of the radiator which engage in openings in rubber blocks on a bottom frame part, and pins on each side of the radiator which engage in openings in rubber blocks which are located in vertically open channels of brackets fixed on side frame parts of the vehicle, the radiator being lowered on to the respective blocks and brackets, and clips then being engaged with the brackets to prevent upward movement of the rubber blocks therein.

6 Claims, 8 Drawing Figures

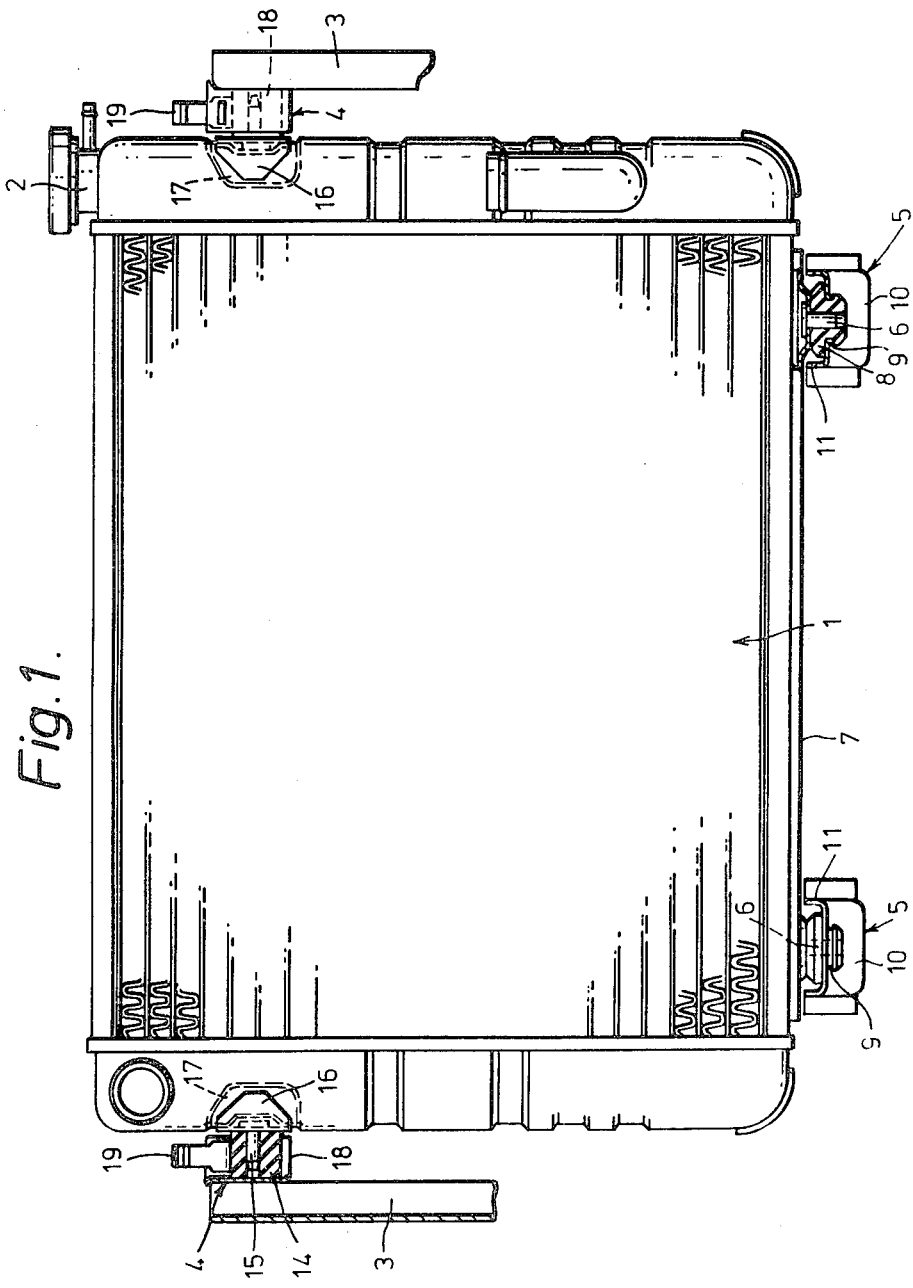

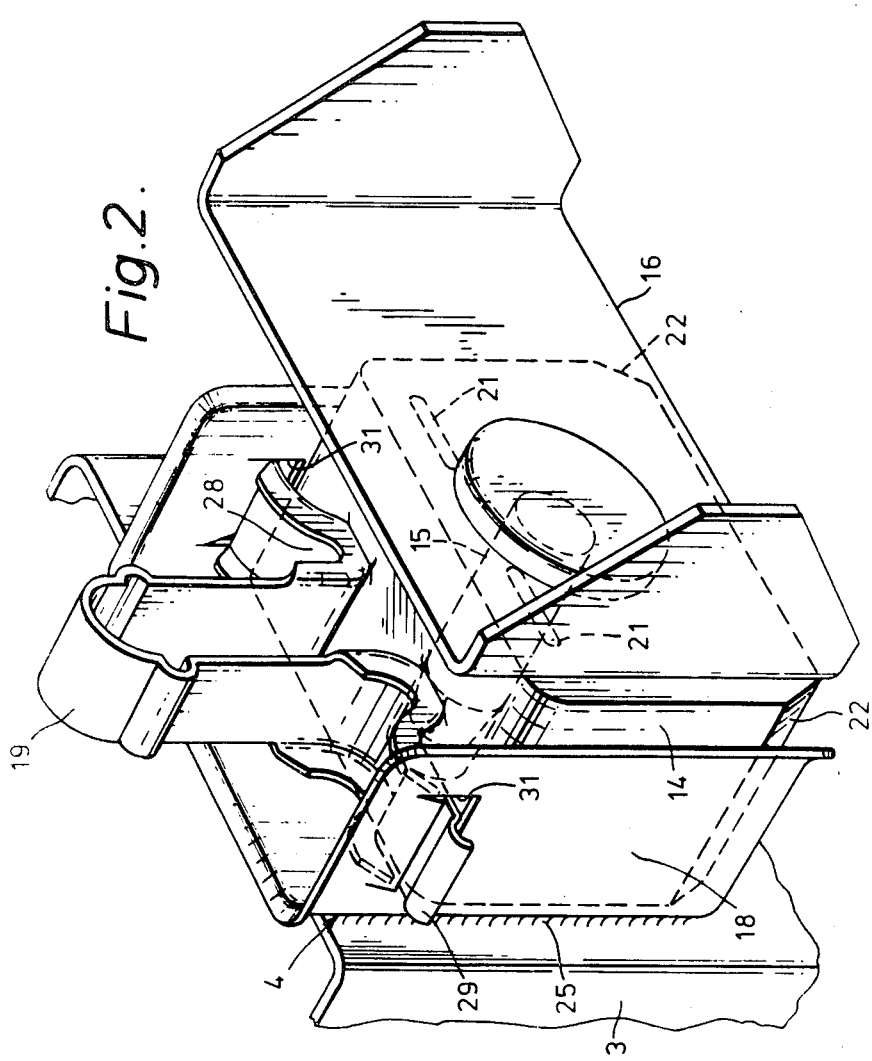

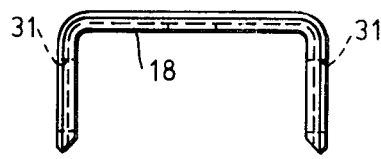
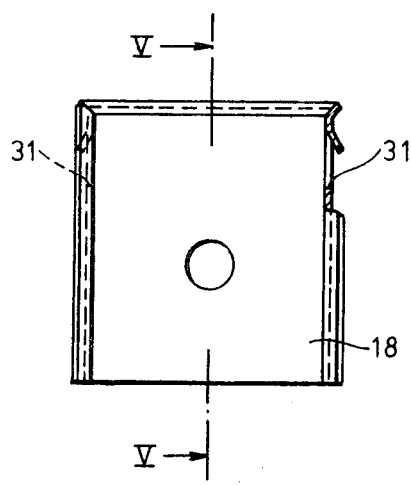
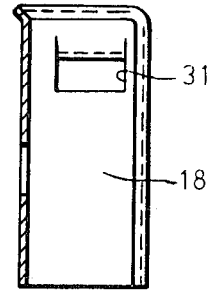
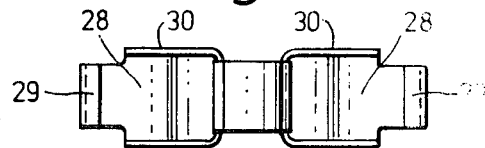
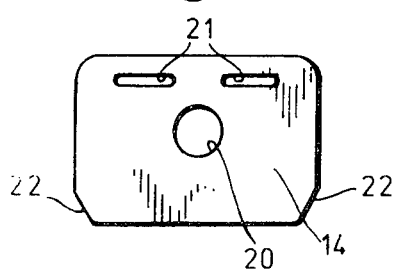
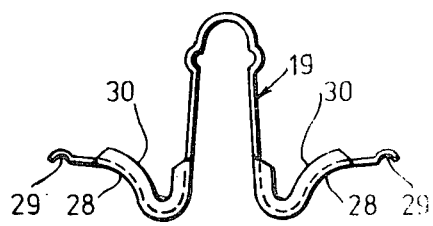

RADIATOR MOUNTINGS FOR MOTOR VEHICLES

This invention relates to motor vehicle radiator mountings and more particularly to a radiator mounting assembly whereby the radiator of a vehicle can be resiliently supported by means of elastomeric elements interposed between retainers and the side and base portions of the radiator.

U.S. Pat. No. 3,929,201, assigned to the assignees of the present invention, discloses a resilient three-point mounting for a motor vehicle radiator using elements of simple construction capable of simple and rapid assembly whilst reliably securing the radiator against displacement.

The present invention was devised with a view to providing a radiator mounting assembly which would be of even simpler construction and would permit even simpler and more rapid assembly of the radiator than the arrangement disclosed in the aforesaid U.S. Pat. No. 3,929,201.

A radiator mounting assembly according to the present invention, for use in a motor vehicle having a body with a bottom frame forming part of a lower mounting for the base of a radiator, and side frame parts forming parts of two mountings for the opposite side portions of the radiator, comprises at least one pin fixed on and depending from the base of said radiator, and at least one elastomeric block fixed on said bottom frame and formed with an upwardly opening cavity in which the respective pin is engaged to locate the radiator base on the bottom frame; a pair of U-shaped brackets respectively secured on said side frame parts of the vehicle body so as to provide a pair of vertical channels which face towards each other; a pair of elastomeric blocks respectively mounted on opposite side portions of the radiator and fitting in said channels; and a pair of retainer members respectively secured to said brackets and engaging said elastomeric blocks therein so as to prevent upward displacement of said blocks from said brackets.

The elastomeric blocks on the side portions of the radiator are conveniently mounted thereon by forming the blocks with openings therethrough by which the blocks can be pressed on to pins secured to the side portions of the radiator and extending laterally therefrom, the pins conveniently being of similar construction to the pin or pins fixed on the base of the radiator for engagement with the elastomeric block or blocks fixed on the bottom frame of the vehicle.

The retainer members are conveniently formed as spring clips of inverted U-shape with reflexed ends which respectively engage in opposed openings in the arms of the U-shaped brackets so that the reflexed end portions of the clips bear on the respective elastomeric block in the bracket and prevent vertical displacement of the block in an upward direction, the pins and blocks at the base of the radiator preventing vertical displacement of the blocks on the side portions of the radiator in a downward direction.

The scope of the invention is defined by the appended claims; and the invention and the method by which it is to be performed are hereinafter particularly described with reference to the accompanying drawings in which:

FIG. 1 is a part sectional front elevation of a radiator with a mounting assembly according to the invention;

FIG. 2 is an enlarged perspective view of the parts of the lateral mounting of the radiator shown in the circle indicated by the arrow II in FIG. 1;

FIG. 3 is a plan of a U-shaped bracket shown in FIGS. 1 and 2;

FIG. 4 is a part sectional elevation of FIG. 3;

FIG. 5 is a section on the line V—V of FIG. 4;

FIG. 6 is an end elevation of the elastomeric block shown in FIGS. 1 and 2;

FIG. 7 is a plan of a spring clip shown in FIGS. 1 and 2; and

FIG. 8 is an elevation of the clip in FIG. 7.

FIG. 1 shows a radiator block 1 provided in known manner with a filler pipe 2 and supported in side portions 3 of the vehicle frame in lateral mountings 4 and supported at its base by means of two mountings 5 each comprising a headed pin 6 secured, as by welding or brazing to a fixing strap 7 attached to the base of the radiator 1, and a rubber block 8 with an annular groove 9 therein which engages in a portion 10 of the bottom frame of the vehicle by snapping it into an opening in a tubular neck 11 formed in said bottom frame member portion 10, the pin 6 engaging in a central bore of the block 8. Such a support for the base of the radiator is described and illustrated in the aforesaid U.S. Pat. No. 3,929,201.

The two lateral radiator mountings 4 each consist of a generally rectangular rubber block 14, mounted on a pin 15, (similar to the pins 6) fixed to a support plate 16 brazed or welded on to a respective side portion 17 of the radiator, and a U-shaped bracket 18 fixed to the side frame portion 3 of the vehicle body, to provide a vertical channel which receives the rubber block 14, the two channels facing towards each other. The rubber blocks 14 are retained against upward displacement from the brackets 18 by spring clips 19.

As shown in FIGS. 1, 2 and 6, the rubber blocks 14 are each of generally rectangular form with an aperture 20 extending generally centrally therethrough to receive the pin 15 and with two further apertures 21 of substantially elliptical form extending therethrough parallel to the aperture 20 but placed closer to the upper face of the block as viewed in FIGS. 1, 2 and 6.

The lower edges of the block are chamfered as indicated at 22 to facilitate introduction into the brackets 18, as hereinafter described.

Each of the brackets 18 (FIGS. 2 and 4 to 6) is of general U-shape and is secured, as by welding or brazing indicated at 25 (FIG. 2) to the side frame portion 3 of the vehicle, the free edges of the bracket preferably being outwardly flared, as shown in FIGS. 2 and 3 to 5, to facilitate the introduction therein of the rubber blocks 14. As shown in FIG. 2, the brackets 18 are secured so as to provide a channel which is open vertically; and the depth of the bracket is greater than the depth of the rubber blocks 14 and the width of each of the two side arms of the bracket is less than that of the corresponding side of the rubber block 14 engaged thereby when installed, as shown in FIG. 2. Also, the dimensions of the rubber block 14 and the bracket 18 are such that the rubber block is slightly compressed when fitted into the bracket, such compression being facilitated upon the introduction of the block into the bracket by the aforesaid outwardly flared edges of the bracket, and the chamfered corners 22 of the block.

The spring clips 19 (FIGS. 2, 7 and 8) are each formed of strip material and are of inverted U form with reflexed end portions 28, which preferably terminate in downwardly bent-over ends 29. The sides of the reflexed end portions 28 are turned up as shown at 30 so as to provide a smooth surface for engagement with the rubber block 14, as shown in FIG. 2.

As shown in FIGS. 2 and 3 to 5, the side arms of the bracket 18 are lanced near their upper ends to form rectangular apertures 31 through which the spring clip ends 29 protrude when the spring clips are positioned as shown in FIG. 2, the bent-up sides 30 of the reflexed end portions limiting the amount by which the ends 29 protrude. The curvature of the reflexed end portions 28 is such that, with the clips 19 arranged as shown in FIG. 2, the portions of the rubber block 14 overlying the apertures 21 are resiliently depressed so that the clip and block are maintained in firm contact with each other and displacement and rattling of the parts under vibration will be prevented.

When the radiator 1 is installed in the vehicle it is located over the rubber blocks 8 and lowered to engage the pins 6 in the apertures in the blocks 8; at the same time the rubber blocks 14, (previously fitted on the pins 15 secured on the radiator by the support plates 16) are pressed downwardly into the vertical channels of the brackets 18, the outwardly flared edges of the brackets and the chamfered lower ends of the blocks 14 facilitating the insertion of the blocks 14 in the brackets 18 under slight compression. A spring clip 19 is then gripped to bring the reflexed end portion 28 together and enable the ends 29 to be inserted through the apertures 31 in each bracket, the resilience of the clips and of the depressed portions of the block 14 over the apertures 21 retaining the ends thereof in such position and securing the blocks 14 against upward displacement from the brackets 18.

In order to remove the radiator it is only necessary to grip the clips to release the ends 29 from the apertures 31 and then lift the radiator off the blocks 8, the blocks 14 being lifted out of the brackets 18 at the same time.

What is claimed is:

1. In a radiator mounting assembly for a radiator, for use in a motor vehicle having a body with a bottom frame forming part of a lower mounting for the base of a radiator, and side frame parts forming parts of two mountings for opposite side portions of the radiator, said assembly comprising at least one pin fixed on and depending from the base of said radiator, and at least one elastomeric block fixed on said bottom frame and formed with an upwardly opening cavity in which the respective pin is engaged to locate the radiator base on the bottom frame; a pair of U-shaped brackets respectively secured on said side frame parts of the vehicle body so as to provide a pair of vertical channels which face towards each other; a pair of elastomeric blocks respectively mounted on opposite side portions of the radiator and slidably fitting in said channels while permitting the radiator base to rest on the elastomeric block on the bottom frame; and a pair of retainer members respectively secured to said brackets and forcibly engaging said elastomeric blocks therein so as to prevent upward displacement of the blocks in said channels and thereby hold the radiator base against the elastomeric block on the bottom frame.

2. A radiator assembly as claimed in claim 1, in which each said side portion of the radiator has a pin extending laterally therefrom and said blocks in said brackets are each formed with an opening therein in which the respective pin is engaged to mount the blocks on said radiator side portions.

3. A radiator assembly as claimed in claim 2, in which said retainer members are formed as spring clips of inverted U-shape with reflexed end portions which respectively engage in opposed openings the arms of said U-shaped brackets and which bear on the respective elastomeric block in the bracket to restrain the block against upward displacement in the channel of the bracket.

4. A radiator assembly as claimed in claim 3, in which the respective dimensions of said blocks in said brackets are such that the blocks are under a moderate degree of compression after being fitted in said brackets.

5. A radiator assembly as claimed in claim 4, in which the edges of said blocks which engage said brackets upon insertion therein are chamfered to facilitate such insertion.

6. A radiator assembly as claimed in claim 4, in which each of said blocks in said brackets is formed with openings therethrough underlying the portion of the block engaged by said reflexed end portions of the respective clip engaged therewith, to permit resilient compression of said block portion by said clip when engaged thereby.

* * * * *